United States Patent [19]
Markley et al.

[11] Patent Number: 5,749,353
[45] Date of Patent: May 12, 1998

[54] CUTTING BLADE WITH AN IMPACT LOAD PREVENTION LAYER

[75] Inventors: Charles E. Markley, Lee's Summit, Mo.; Rick Younger, Las Vegas, Nev.

[73] Assignee: Diamant Boart, Inc., Kansas City, Mo.

[21] Appl. No.: 723,684

[22] Filed: Sep. 30, 1996

Related U.S. Application Data

[63] Continuation of Ser. No. 252,687, Jun. 2, 1994, Pat. No. 5,560,348.

[51] Int. Cl.⁶ .................. B28D 1/14; B28D 1/12
[52] U.S. Cl. .................. 125/20; 451/342; 125/15; 408/143
[58] Field of Search .................. 451/548, 342, 451/541, 542, 543, 544; 83/835; 125/20, 15; 408/143, 145, 714, 204; 175/405.1

[56] References Cited

U.S. PATENT DOCUMENTS

| | | | |
|---|---|---|---|
| 2,295,282 | 9/1942 | Mall | 451/342 |
| 2,298,975 | 10/1942 | Shelburne | 408/204 |
| 2,353,864 | 7/1944 | Wooddell | 451/548 |
| 2,563,559 | 8/1951 | Sneva . | |
| 2,726,493 | 12/1955 | Young | 451/342 |
| 3,151,513 | 10/1964 | Rowlands . | |
| 3,342,530 | 9/1967 | Krekeler . | |
| 3,392,616 | 7/1968 | Hensley . | |
| 3,613,472 | 10/1971 | Held . | |
| 4,232,580 | 11/1980 | Stewart . | |
| 4,240,315 | 12/1980 | Tuomaala . | |
| 4,285,260 | 8/1981 | Salje et al. . | |
| 4,331,056 | 5/1982 | Hombach et al. . | |
| 4,549,372 | 10/1985 | Sexton et al. . | |
| 5,083,839 | 1/1992 | Younger . | |

FOREIGN PATENT DOCUMENTS

| | | |
|---|---|---|
| 0534040 | 7/1958 | Italy . |
| 56-6163882 | 12/1981 | Japan . |
| 1303385 | 4/1987 | U.S.S.R. . |

*Primary Examiner*—Robert A. Rose
*Attorney, Agent, or Firm*—Kokjer, Kircher, Bowman & Johnson

[57] ABSTRACT

A saw blade is provided which includes an inner collar separated from an outer collar with a resilient isolated layer. The inner collar fastens to the arbor shaft of a driving motor, while the outer collar is welded to the rim containing hardened particles, such as diamond bits. The inner and outer collars form inner and outer collar flanges which receive the resilient isolating material therebetween. In an alternative embodiment, the inner and outer collars are separated from one another with a plurality of plugs formed of resilient isolating material. The plurality of plugs are formed in a circular pattern about the arbor shaft and are spaced apart from one another. In another embodiment, a vibration dampening coupler is fastened to the arbor shaft and formed separate from the cutting blade. The isolating resilient layer may be formed as a solid layer, as a plurality of O-rings, or with a void therein.

8 Claims, 7 Drawing Sheets

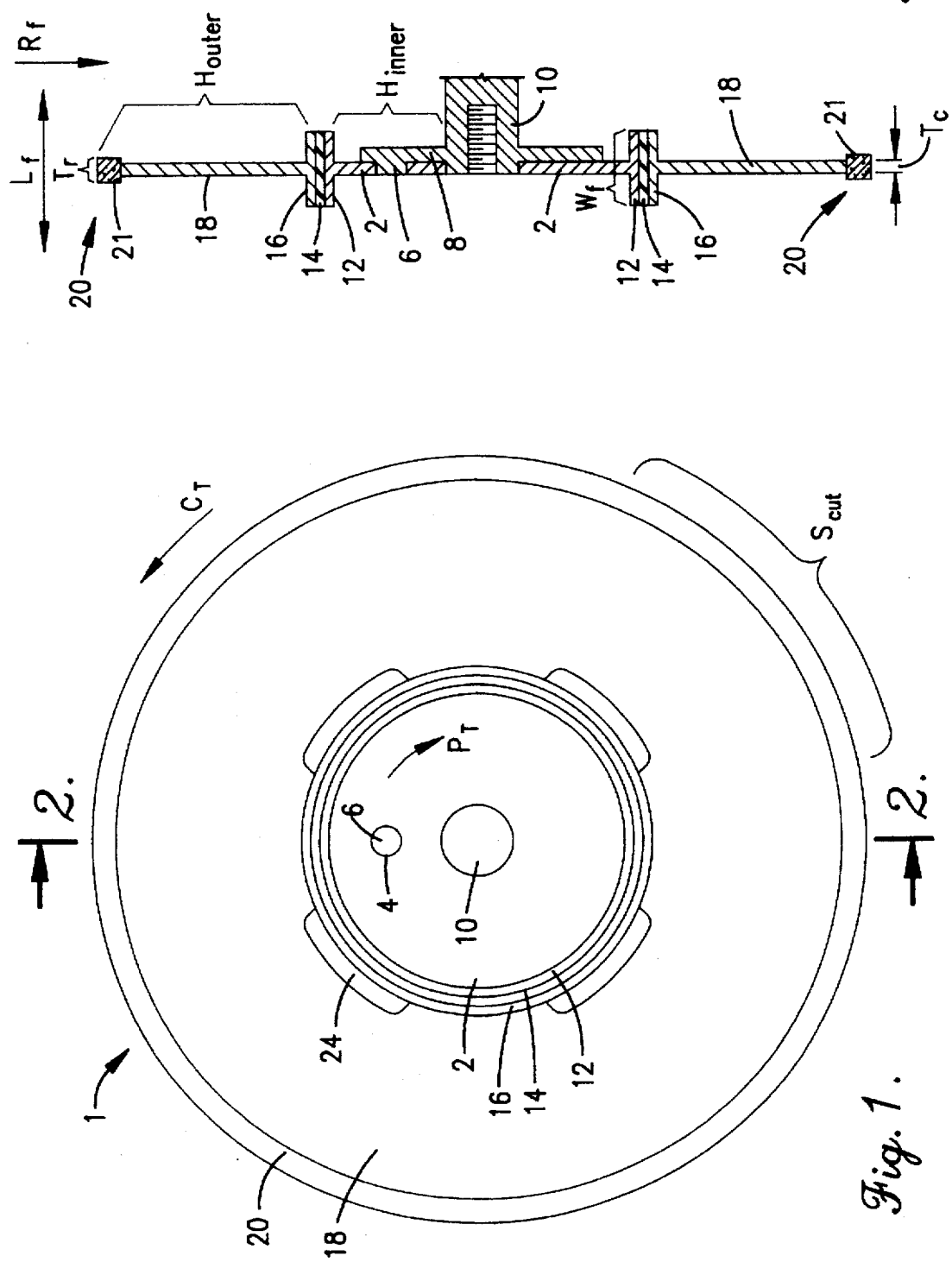

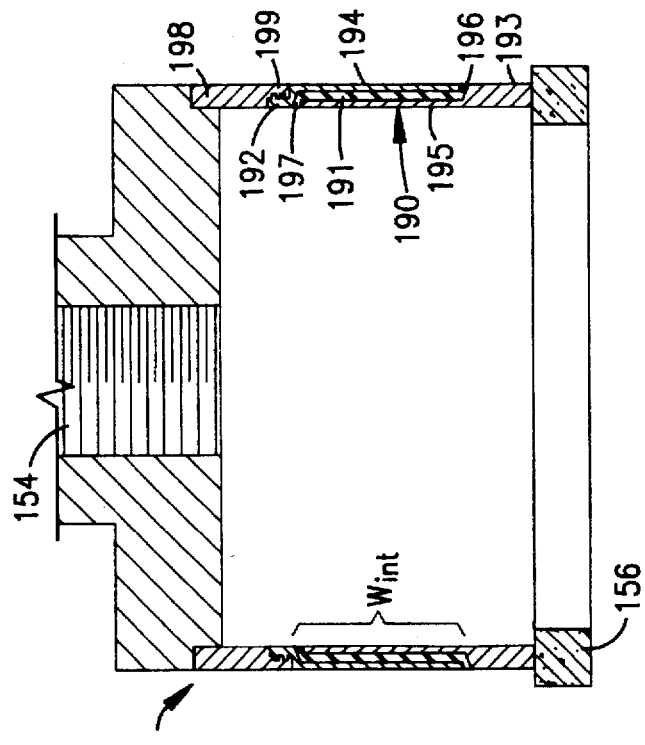
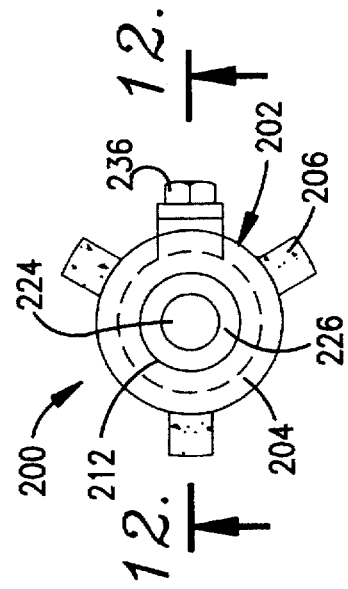
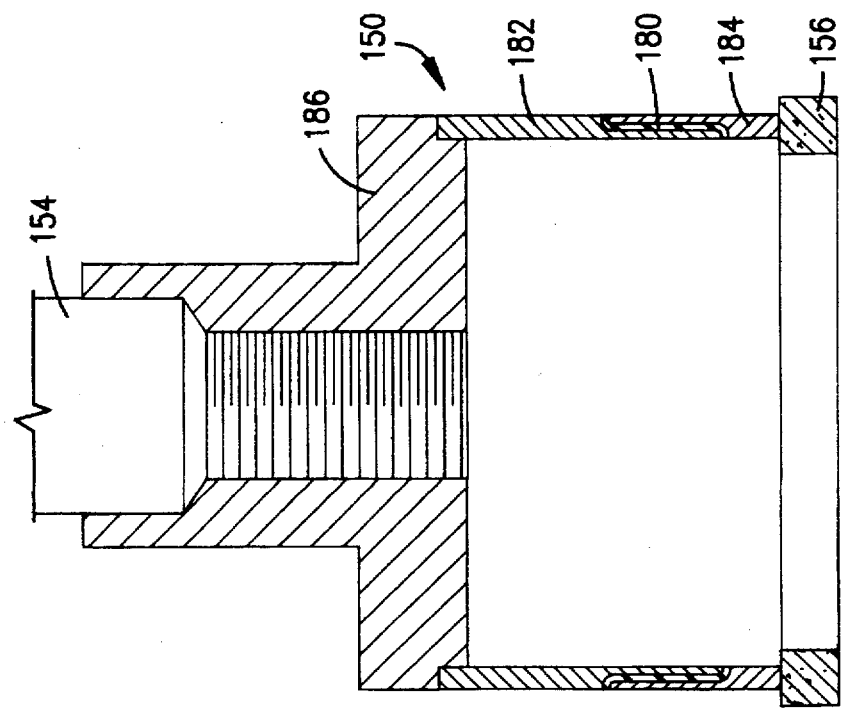

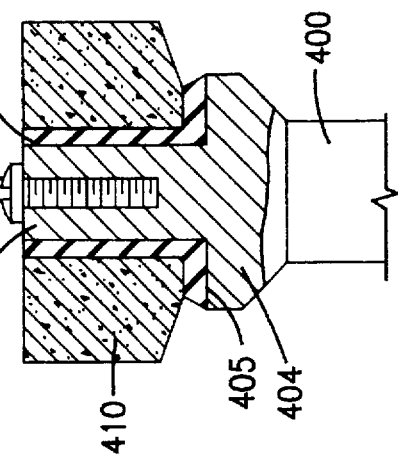
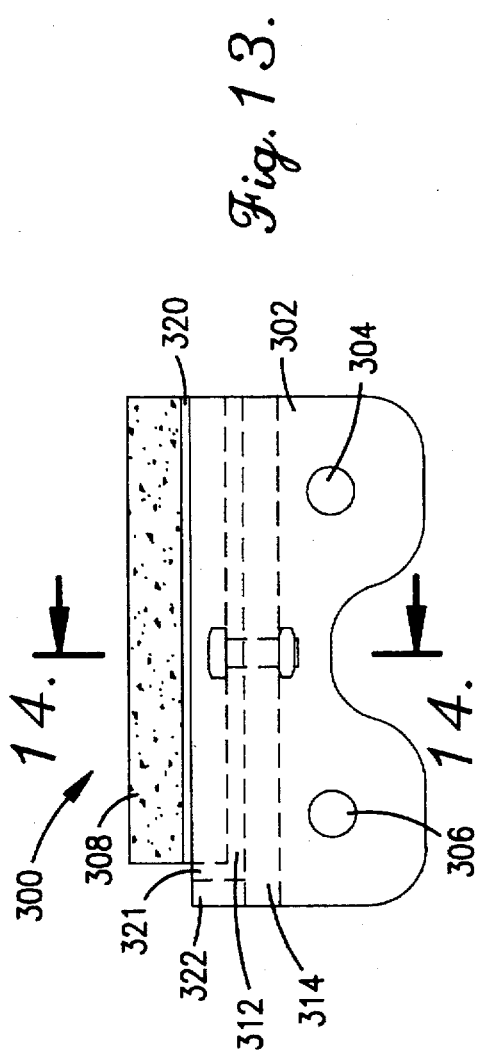
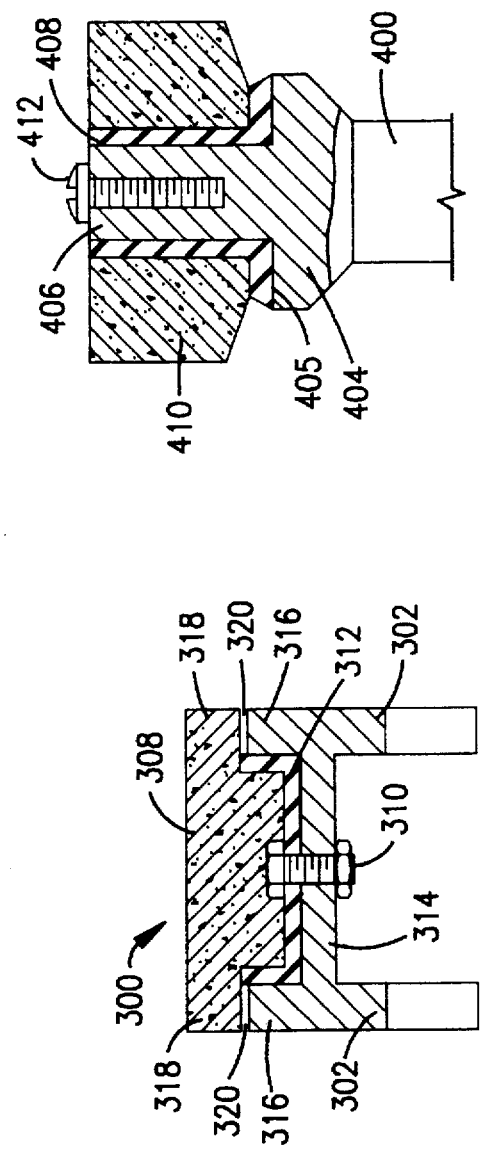
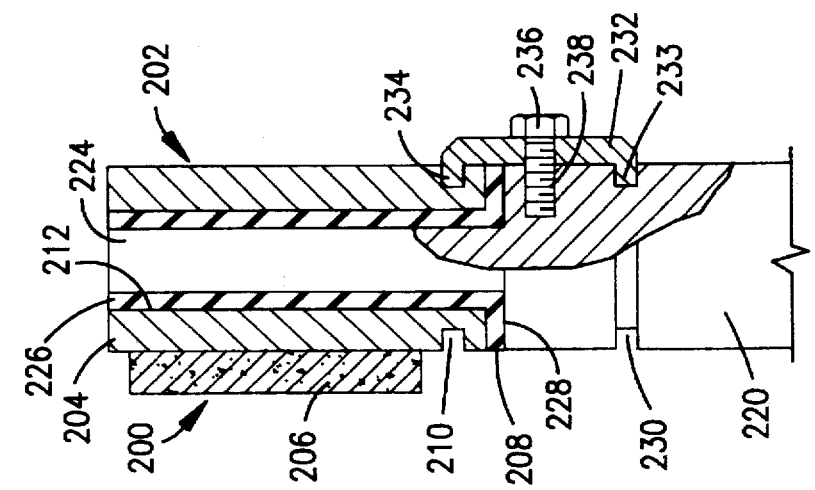

CUTTING BLADE WITH AN IMPACT LOAD PREVENTION LAYER

This is a continuation of application Ser. No. 08/252,687, filed Jun. 2, 1994 now U.S. Pat. No. 5,560,348.

BACKGROUND OF THE INVENTION

1. Field of the Invention

The present invention relates in general to a saw blade having a rim embedded with hard particles for cutting hard materials, such as concrete, masonry, tile, granite and the like. More specifically, the invention relates to a cutting blade that includes an impact load prevention layer therein.

2. Description of the Related Art

In the past, circular saw blades for cutting soft materials, such as wood, having teeth about the perimeter have been proposed which include dampening means (such as in U.S. Pat. Nos. 2,563,559, 4,232,580, and 4,240,315). These conventional saw blades adjust the natural resonance frequency of the blade to dampen blade vibration. Towards this end, the '599 patent fills radial slots within the blades steel core with a soft metal and a reinforcing rib. The '315 patent divides the blade into sectors via slots extending from the outer periphery of the blade towards the hub. Each slot is a different length to provide adjoining sectors with different natural frequencies. The '260 patent forms a saw blade with two circular annular chambers along opposite sides thereof. Each chamber includes a dampening layer made of a resin adhesive which is highly elastic.

However, these blades were ineffective for cutting extremely hard materials, such as concrete, masonry, tile, granite and the like. Hence, alternatively blades were proposed with extremely hard abrasive outer rims mounted upon a steel core to cut these materials. The outer rim includes particles, such as diamond particles, tungsten carbide, polycrystalline diamonds, and the like, mixed within a bonding agent. The mixture is molded to form a hardened outer rim. The hard particles extend outward about the perimeter of the blade and, during cutting, these particles cause the blade to shake and quiver in a radial direction, thereby causing the blade to bounce against the surface being cut. This radially directed reverberation is commonly referred to as "chatter." Chatter increases the noise level produced during the cutting operation. Additionally, saw blades formed with hardened outer rims are typically powered with combustion engines, such as gasoline-powered engines. The combustion engines produce additional vibrations which are transmitted along the drive shaft is to the saw blade, thereby precipitating chatter.

When the blade radially bounces against the surface to be cut, the hardened particles projecting from the outer rim experience large instantaneous impact loads. These hard materials are typically, extremely brittle. Consequently, the out most portion of each hard particle tends to shear off during impact loads. Thus, these types of saw blades tend to wear quickly, unless the outer rim of the saw blade is maintained in constant contact with the surface to be cut (i.e., a constant cutting mode)

However, heretofore no satisfactory method has been proposed for eliminating impact loading within a saw blade containing an outer rim embedded with hard particles. Nor do conventional saw blades satisfactorily reduce the noise level. Moveover, conventional systems typically utilize a steel core since steel is easily bonded to the outer rim. However, steel exhibits limited heat dissipating characteristics. The saw blade size dictates its ability to dissipate heat without this heat being transmitted to the arbor shaft. Typically, a proportional relationship exists between the size of the saw blade and the horsepower of an engine which is usable therewith.

In a somewhat corollary field, grinding drums have been proposed for minimizing vibration (such as in U.S. Pat. Nos. 4,549,372 and 5,083,839).

The system of the '839 patent, as proposed by a coinventor of the subject invention, is directed to a grinding drum for grooving or grinding pavement. The drum of the '839 patent comprises an inner cylindrical core having a plurality of sleeves disposed thereon. The inner core is surrounded by an intermediate cylindrical sleeve which absorbs shocks, jars, and harmonic vibrations imparted to the rotary drum during use. The intermediate sleeve is surrounded by an outer sleeve which serves as the mounting surface for grooving segments. The inner core is formed of metal, the intermediate sleeve is formed of an impact resistant material, and the outer sleeve is formed of steel. A plurality of grooving segments are disposed about the outer sleeve, each grooving segment comprising a plurality of grooving surfaces disposed in parallel rows. The grooving drum of the '839 patent forms grooves approximately ⅛" wide and ³⁄₁₆" deep, with a lateral distance of approximately ¾" between each groove.

The system of the '372 patent discloses a grinding drum with a hub mounted on an abrasive rim. The rim is resiliently depressible radially inward toward the hub during a grinding operation. In one embodiment, the hub is surrounded by a resilient ring, formed of rubber or honeycombed metal. The resilient ring is surrounded by a thin flexible aluminum hoop. When the rim is depressed it loses its circular shape.

A cutting wheel has been proposed (U.S. Pat. No. 3,342,530) for a mining machine which includes an easily replaceable cutter bearing rim. The '530 patent includes a cutting wheel having an integral shaft and core flange. The core flange projects outward and forms an inner rim element immediately adjacent an outer rim element. A solid resilient substance is formed between the inner and outer rim elements to cushion or absorb a portion of the cutting strain, such as when the cutting bit encounters material within a coal vein which is harder than the coal being cut by the tool.

However, it has been impossible to implement the vibration dampening techniques of the '839 patent, '372 patent and '530 patent with a cutting wheel having hardened particles embedded in an outer rim thereof. Cutting wheels of this type experience forces uncharacteristic of grinding wheels and mining tools. Further, cutting wheels of this type carry design restraints which need not be addressed with grinding wheels and mining tools.

For instance, in the systems of the '839 and '372 patents, the vibration dampening layer is formed with a width equal to, or greater than, that of the grinding surface. This is necessary to provide sufficient support for the grinding surface and to withstand the opposed forces exerted by the core and the grinding surface. However, a cutting surface of diamond embedded cutting wheel is formed with a substantially lesser width. Thus, a resilient pad equal in width to a diamond embedded cutting surface would be unable to support the cutting rim, nor could it withstand the circumferential and lateral forces between the drive shaft and the cutting rim.

Also, the vibration dampening layers of the '839, '372 and '530 patents are positioned immediately adjacent the grinding surface. However, these dampening layers would create complications within a cutting wheel since the dampening layer would necessarily pass through the cut. Thus, when cutting hard materials such as concrete and masonry, the width of the dampening layer must be smaller than the width of the cut. The systems for grinding wheels are not limited by a similar design restriction since the body of the grinding wheel never passes through a cut within the surface being ground. The vibration dampening layers of these conventional systems are not designed to withstand the lateral prying forces experienced by a diamond embedded cutting wheel. Throughout a grinding operation, grinding wheels rest against the outer surface of the material being machined. Hence, the grinding surface does not overly resist prying forces applied by the user to turn the tool. Nor do the sides of the grinding wheel experience significant contact and lateral forces from the cutting surface.

Further, the dampening layer of the '372 patent is formed to allow the grinding surface to distort to an oval, or noncircular, shape during a grinding operation. However, if a cutting wheel were so deformed, it would not cut properly. Moreover, the systems of the '839 and '372 patents need not be as concerned with impact loading since grinders offer a much larger working surface area, over which the impact load is distributed. Grinders do not focus the energy of the grinder along a single narrow path. Divergently, cutting wheels offer a very small cutting area in which the cutting energy is focused. Thus, impact loads are quite focused within this area.

Finally, a grinding drum is much larger than a cutting wheel, and thus a grinding drum is more capable of dissipating heat. Accordingly, designers of grinding drums need not be as critical of the heat dissipating characteristics of the end design.

The need remains in the present field for an improved blade design to address the problems and drawbacks heretofore experienced. The primary objective of this invention is to meet this need.

SUMMARY OF THE INVENTION

An object of the present invention is to provide a saw blade for cutting hard materials which includes an impact load preventing layer.

Another object of the present invention to reduce the wear upon hardened materials, such as diamond bits, formed about the perimeter of a saw blade by eliminating impact loads upon the diamonds and maintaining contact between the diamond surface and the material to be cut at all times.

It is another object of the present invention to balance the blade by injecting a liquid into a void formed within a resilient layer formed about the core and separating the core from the outer rim.

It is a further object of the present invention to provide a resilient material between the core and outer rim, the resiliency of which is variable.

It is a further object of the present invention to reduce the noise, weight, and cost of the saw blade.

It is a further object of the present invention to provide a saw blade which dissipates heat more quickly by utilizing a heat dissipating core and isolation layer.

Other and further objects of the invention, together with the features of novelty pertinent thereto, will appear in the detailed description set forth below.

In summary, a saw blade is provided which includes an inner collar separated from an outer collar with a resilient isolated layer. The inner collar fastens to the arbor shaft of a driving motor, while the outer collar is welded to the rim containing hardened particles, such as diamond bits. The inner and outer collars form inner and outer collar flanges which receive the resilient isolating material therebetween. In an alternative embodiment, the inner and outer collars are separated from one another with a plurality of plugs formed of resilient isolating material. The plurality of plugs are formed in a circular pattern about the arbor shaft and are spaced apart from one another. In another embodiment, a vibration dampening coupler is fastened to the arbor shaft and formed separate from the cutting blade. The isolating resilient layer may be formed as a solid layer, as a plurality of O-rings, or with a void therein.

BRIEF DESCRIPTION OF THE DRAWINGS

The objects and features of the invention noted above are explained in more detail with reference to the drawings, in which like reference numerals denote like elements, and in which:

FIG. 1 is a side elevational view of a cutting blade according to the present invention;

FIG. 2 is a side sectional view of the cutting blade of FIG. 1 taken along line 2—2;

FIGS. 10A–10C are side sectional views of alternative embodiments;

FIG. 11 is an end view of an alternative embodiment;

FIG. 12 is a side sectional view of the embodiment of FIG. 11 along a line 12—12 of FIG. 11;

FIG. 13 is a side view of an alternative embodiment;

FIG. 14 is an end sectional view of the embodiment of FIG. 13 along line 14—14 in FIG. 13;

FIG. 15 is a side sectional view of an alternative embodiment;

DETAILED DESCRIPTION OF THE INVENTION

Figure 4:
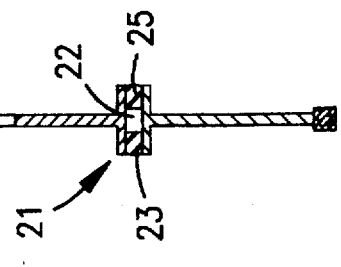
FIG. 4 is a side sectional view of an alternative embodiment in which two isolation layers are formed with a void therebetween for holding pressurized gas or liquid.

Referring to FIG. 1, the instant invention is generally designated by the reference numeral 1. The saw blade 1 includes a core having a circular inner collar 2 which may be formed of a highly heat dissipative material, such as aluminum. The inner collar 2 includes a hole in the center thereof which receives an arbor shaft 10 of the saw blade driving assembly, such as an electric or gasoline powered motor. The inner collar 2 includes a locking hole 4 positioned radially outward from the center of the inner collar 2. The locking hole 4 receives a pin 6 (FIG. 2) which is integrally formed with a flange 8 which projects radially outward from the arbor shaft 10. The inner collar 2 includes an inner collar flange 12 formed about its perimeter and projecting outward in opposite directions parallel to a longitudinal axis about which the blade rotates. The inner collar flange 12 is surrounded by an isolation layer 14 (FIG. 2). The isolation layer 14 is formed of a resilient material, such as neoprene, propylene, plastic, and the like, which also exhibits strong heat dissipating characteristics. The isolating layer 14 may be vulcanized and bonded to the inner collar flange 12. In the first embodiment, the isolation layer 14 is formed as an integral layer.

The inner collar 2 and isolation layer 14 are received within an outer collar flange 16 formed upon an inner circumferential surface of an outer collar 18. The inner and outer collars 2 and 18 are aligned concentrically with one another. The outer collar 18 is formed in a disk-shape with its internal perimeter formed integral with the outer collar flange 16. The external perimeter receives, and is securely welded to, the outer rim 20. The outer rim 20 includes hardened particles, such as diamond particles, tungsten particles, and the like which are embedded within a bonding agent. The outer rim 20 could be formed of separate segments.

The outer collar 18 includes heat sinks 24 shaped as elongated, arcuately shaped voids about the inner periphery of the outer collar 18 proximate the outer collar flange 16. The heat sinks 24 function to draw heat away from the outer rim 20 and dissipate this heat before it is transmitted to the arbor shaft 10. Optionally, the heat sinks 24 may be omitted depending upon the particular application intended for the cutting blade. The isolation layer 14 also draws heat away from the outer rim 20 and prevents it from being transmitted to the arbor shaft 10. The outer collar 18 is formed of steel or a similar high strength material which is easily laser welded to the rim 20, while the inner collar 2 may be formed of a heat dissipating material, such as aluminum.

As illustrated in FIG. 2, the inner and outer collars 2 and 18 are formed with a thickness $T_c$ which is less than a thickness $T_r$ of the outer rim 20. The thickness $T_c$ of the outer collar 18 is thin enough to pass easily through a cut, produced by the outer rim 20, without rubbing against the sides of the cut. The thickness $T_c$ of the inner collar 2 is substantially equal to that of the outer collar 18. The outer collar 18 is formed with a height $H_{outer}$ such that the distance between the outer rim 20 and the base of the outer collar flange 16 is at least equal to the deepest cut to be effected by the saw blade. The inner collar 2 is formed with a height $H_{inner}$ between the base of the inner collar flange 12 and the arbor shaft 10. The inner and outer collar flanges 12 and 16 are formed with substantially the same dimensions. The flanges 12 and 16 extend outward from the collars 2 and 18, respectively, along a direction parallel to the rotational axis of the arbor shaft 10 to support the outer rim 20. The isolation layer 14 is received between the inner and outer collar flanges 12 and 16 to absorb vibration forces, prevent load impacts and to dissipate heat.

As shown in FIG. 2, the isolation layer 14 and the inner and outer collar flanges 12 and 16 are formed with substantially the same width $W_f$. The width $W_f$ is predetermined to provide a desired interfacing surface area between, and support for, the isolation layer 14 and the inner and outer collars 12 and 16. The area of the interfacing surface is primarily governed by the forces experiences upon the isolation layer 14. The forces experienced by the isolation layer 14 occur in a variety of directions, including along lines $L_f$ and $R_f$. These forces are initiated at the outer rim 20 and transferred along the outer collar 18 and outer collar flange 16, to be absorbed by the isolation layer 14. Additionally, the isolation layer 14 experiences circumferential forces along lines $C_T$ and $P_T$ (FIG. 1). Consequently, the isolation layer 14 must be formed of a material having the necessary resiliency, and with a width $W_f$ sufficient to absorb these forces and to support the outer rim 20 during a cutting operation. The forces exerted upon the saw blade are explained in more detail below, in connection with a cutting operation.

During a cutting operation, a region $S_{cut}$ (FIG. 1) of the saw blade is maintained in contact with the surface to be cut. Within this region, diamond particles projecting from the perimeter of the outer rim 20 contact and cut the material, for instance concrete. When the diamond particles encounter the concrete, the outer rim 20 experiences instantaneous radial forces along line $R_f$ (FIG. 2). The radial forces $R_f$ cause the isolation layer to be compressed or deflected, thereby absorbing the radial force and preventing its transfer to the inner collar 2 and the arbor shaft 10. By absorbing these radial forces, the isolation layer 14 prevents reverberation or bouncing of the saw blade, and thus prevents impact loads between the cut surface and the outer rim 20.

In addition, when the outer rim 20 is within a cut, the side surfaces 21 contact the sides of the cut and often come in contact with stones projecting from the side of the cut. These stones induce lateral forces (along line $L_f$) upon the outer rim 20. Similarly, lateral forces $L_f$ may be experienced when the user attempts to turn or pry the saw to one side within the cut. The lateral forces $L_f$ are transferred along the inner and outer collars 2 and 18, and through the isolation layer 14. Hence, the isolation layer 14 must have sufficient width $W_f$ to resist such forces and maintain the outer collar 18 in a desired radial alignment with the inner collar 2. When the lateral forces $L_f$ are experienced, the length $H_{outer}$ of the outer collar 18 functions as a lever arm when transferring this force to the inner collar 2. Thus, as the height $H_{outer}$ increases, the width $W_f$ of the isolation layer 14 must be increased to increase the interfacing surface and maintain proper lateral support.

Further, as the height $H_{inner}$ of the inner collar decreases, the overall surface area of the isolation layer 14 decreases. The heights $H_{inner}$ and $H_{outer}$ of the inner and outer collars 2 and 18 may be varied. However, as the height $H_{inner}$ of the inner collar is decreased, the resiliency of the isolation layer 14 must be adjusted to ensure that the isolation layer 14 is able to absorb adequately the radial forces $R_f$. To maintain a desired amount of resiliency, the width $W_f$ or the stiffness of the isolation layer may be changed.

Also, as the saw blade is rotated in a clockwise direction, the outer collar 18 experiences a cutting torque resistance $C_T$ in a circumferential direction (see FIG. 1). The inner collar 2 experiences an equal, but opposite, power torque $P_T$. Thus, the isolation layer 14 will experience a shearing force about its perimeter. The isolation layer 14 must be constructed with sufficient surface area to withstand this shearing force.

In an alternative embodiment (FIG. 4), the isolation layer 21 may be formed from two or more separate sections 23 and 25 having void(s) 22 therebetween. The void 22 may be filled with a gas, such as oxygen, or a liquid, such as oil. The pressure of the gas or liquid may be varied in order to adjust the resiliency of the isolation layer 14. By adjusting the resiliency of the isolation layer 14, the impact load prevention characteristic thereof is changed. It is desirable to change this characteristic in accordance with the hardness of the material to be cut. When pressurized gas or liquid are used within the void 22, the gas or liquid functions as an isolation layer. Hence, the region of the inner and outer collar flanges 12 and 16 meeting the void 22 constitute part of the interfacing surface, when compensating for the radial and lateral forces $R_f$ and $L_f$. However, the void 22 does not offer shearing resistance. Therefore, the solid isolation layer 14 must be formed to withstand the cutting torque forces $C_T$ and $P_T$.

Figure 3B:
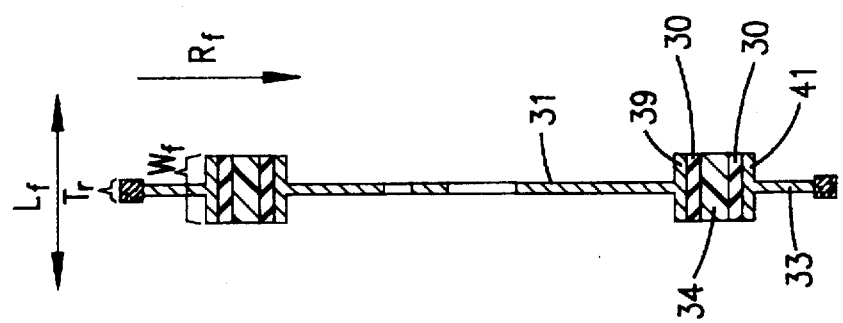
FIG. 3B is side sectional view of the embodiment of FIG. 3A taken line 3B—3B in FIG. 3A.
Figure 3A:
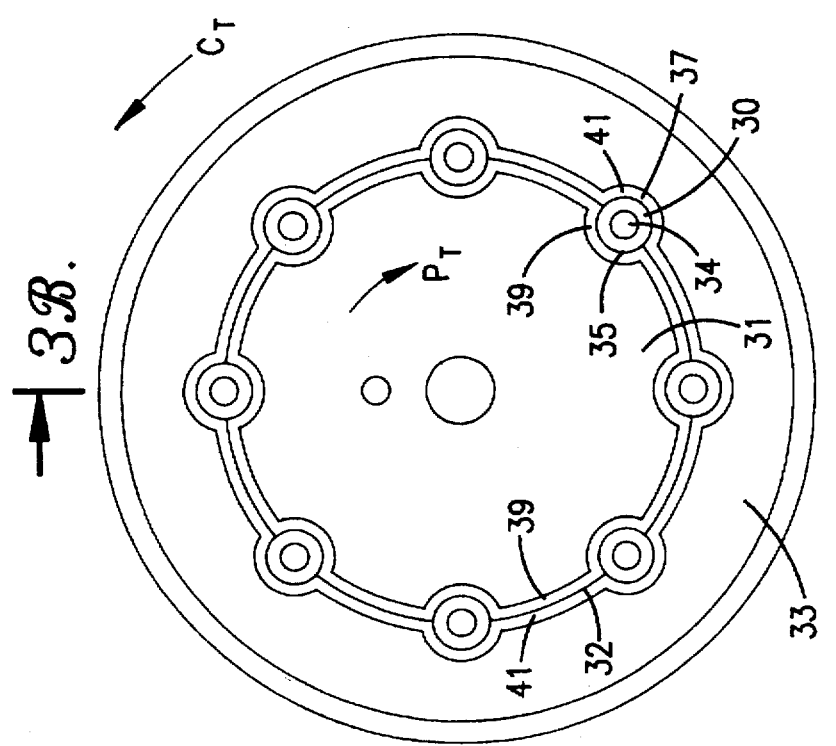
FIG. 3A is a side elevational view of an alternative embodiment of the present cutting blade with a plurality of resilient isolator plugs disposed between core and outer collars of the blade.

FIGS. 3A and 32 illustrate an alternative embodiment in which inner and outer collars 31 and 33, respectively, are formed concentric with one another. The inner and outer collars include inner and outer collar flanges 39 and 41, respectively, located on adjoining edges of each collar. An inner diameter of the outer collar flange 41 is formed slightly larger than an outer diameter of the inner collar flange 39 such that the inner collar 31 is loosely received within the outer collar 33 to form a circular air gap 32 therebetween. A plurality of half-moon shaped recesses 35 and 37 are formed about the adjoining peripheries of the inner and outer collar flanges 39 and 41. The recesses 35 and 37 align to form circular holes through the saw blade. Each hole receives an isolation plug 30. The recesses 35 and 37, and corresponding isolation plugs 30 are positioned evenly about the circular air gap 32 between the inner and outer collars flanges 39 and 41. Each isolation plug 30 is constructed of a resilient material formed in a tubular shape with a hollowed out core.

The core of each plug 30 receives a substantially harder core insert 34, such as a metal or hard plastic insert, which is also tubular in shape. As in the first embodiment, the isolation plugs 30 are formed with a width $W_f$ that is greater than the thickness Tr of the outer rim 20. The inner and outer collar flanges 39 and 41, respectively, extend outward in opposite directions away from the corresponding collar. While the flanges 39 and 41 extend about the circumference of the inner collar 31, optionally, the flanges 39 and 41 may be formed as separate discrete members located immediately adjacent each recess 35 and 37. The isolation plugs 30 and the inner and outer collar flanges 39 and 41 resist the radial, lateral, and circumferential forces $L_f$, $R_f$, $C_T$ and $P_T$ in the same manner as discussed above. The isolation plugs 30 and inserts 34 also serve as heat sinks and allow the blade to be balanced by varying the material used therein. The stiffness of the isolation plugs 30 may also be varied by changing the width of the plugs 30 and by changing the material used therein. To replace a plug 30, the user removes the insert 34, collapses the plug 30 upon its core and pulls the plug 30 from the blade. To insert a new plug 30, the user inserts a collapsed plug 30, allows it to expand and introduces the insert 34 into the hollowed core. Optionally, the plugs could be formed as a solid insert.

Figure 5:
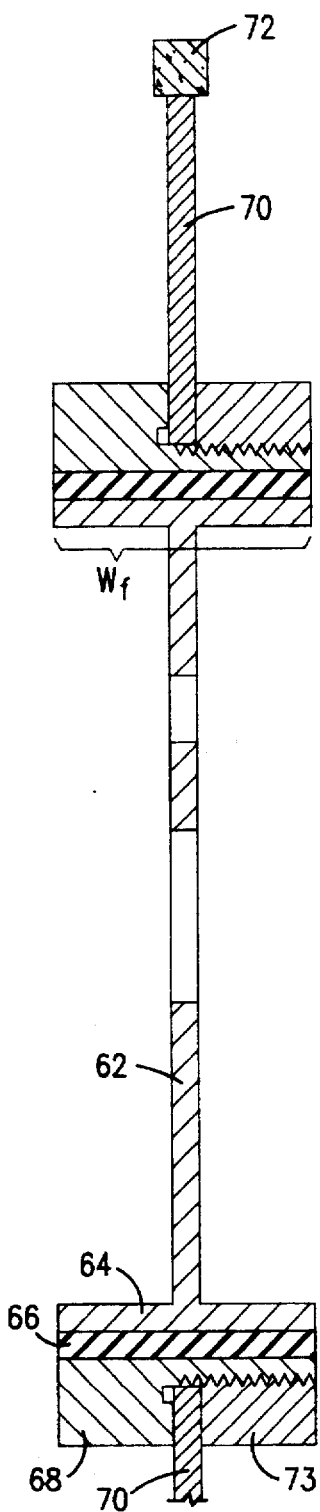
FIG. 5 is a side sectional view of an alternative embodiment in which an outer collar is press fitted onto an inner core.

FIG. 5 illustrates another embodiment in which an inner collar 62 is integrally formed with an inner collar flange 64 in substantially the same manner as in the first embodiment. An isolation layer 66 is formed about the perimeter of the inner collar flange 64. An outer collar flange 68 is formed with a L-shaped cross-section, a back side thereof providing the interfacing surface with the isolation layer 66. The inner and outer collar flanges 64 and 68, and the isolation layer 66 are formed with the same width $W_f$, for reasons explained above in connection with FIGS. 1 and 2.

As illustrated in FIG. 5, the isolation layer 66 may be injection molded between the inner and outer collar flanges 64 and 68. The outer collar 70 and rim 72 are secured on the outer collar flange 68 with a keeper 73 which is threadably secured to the outer collar flange 68. Optionally, the isolation layer 66 may be formed from two or more layers of resilient material separated by one or more voids (as in FIG. 4) or as a series of O-rings (as in FIG. 6) or preformed, press fit, extruded in any desired shape.

Figure 6:
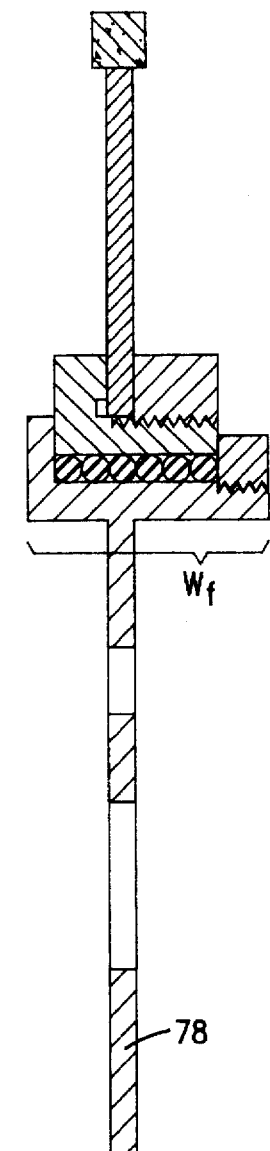
FIG. 6 is a side sectional view of an alternative embodiment in which a plurality of O-rings are utilized as the resilient isolating layer and in which the O-rings and a separate outer collar are retained upon the inner collar with threaded keepers.

Referring to FIG. 6, an alternative embodiment is illustrated in which a isolation layer 74 and the outer collar 76 are easily removed from the inner collar 78. More specifically, the inner collar 78 includes an L-shaped inner collar flange 80 having an upper portion 82 which is threaded. A base 84 of the inner flange 80 projects radially outward a distance sufficient to receive the isolation layer 74 and a portion of the outer collar flange 86. The isolation layer 74 is formed as a plurality of O-rings, each of which has a diameter just sufficient to extend over the inner collar flange 80. Optionally, the isolation layer 74 may represent one or more solid layers separated by voids as discussed in the previous embodiments.

The L-shaped inner collar flange 80 threadably receives an O-ring keeper 88 about its outer portion to retain the isolation layer 74 and the outer collar flange 86 thereon. The outer collar flange 86 includes a L-shaped base 90 and a threaded upper portion 92. The outer collar flange 86 receives the outer collar 76 and a collar keeper ring 94. The outer collar 76 is slidably received upon an outer periphery of the outer collar flange 86 and is retained in an operating position by securing the collar keeper ring 94 thereon. Optionally, the abutting surfaces of the inner flange base 84, outer flange base 90 and keeper 88 may include resilient layers. Optionally, base 90 may be welded to flange 86.

Figure 7:
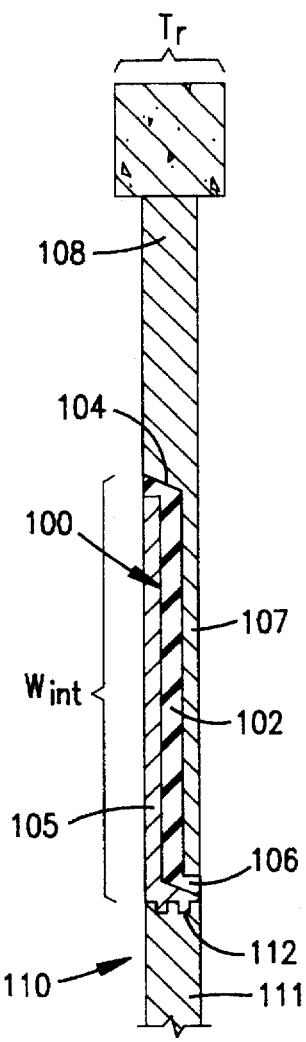
FIG. 7 is a side sectional view of an alternative embodiment in which the isolating layer is formed with a Z-shaped cross section.

FIG. 7 illustrates another embodiment in which the isolation layer 100 is formed with a Z-shaped cross-section having a body 102 which extends in a radial direction perpendicular to the rotational axis of the blade. The core includes inner and outer collars 110 and 108, having inner and outer collar flanges 105 and 107, respectively, that extend in a radial direction perpendicular to the rotational axis. The body 102 of the isolation layer 100 is formed integrally with upper and lower resilient tips 104 and 106 which project in opposite directions to isolate entirely the outer collar 108 from the inner collar 110. The resilient tips 104 and 106 are flared nearest the outer surfaces of the blades front and back faces. The isolation layer 100 provides an interfacing surface having a width $W_{int}$ which extends the entire length of the body 102 and inner and outer flanges 105 and 107. The width $W_{int}$ of the interfacing surface must satisfy the same parameters as the width $W_f$ of the isolation layers 14, 22, 66 and 74 in each previous embodiment. Namely, the width $W_{int}$ of the interfacing surface must be sufficient to achieve the above-noted object. Optionally, the inner collar 110 may be threadably secured to the central core 111 via threads 112.

Figure 8:
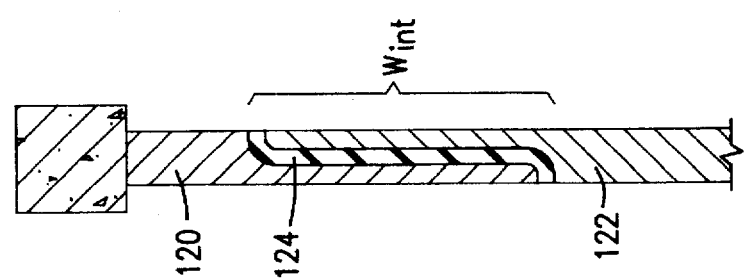
FIG. 8 is a side sectional view of an alternative embodiment in which the isolating layer is formed with a S-shaped cross section.

FIG. 8 illustrates an alternative embodiment, substantially resembling that of FIG. 7, except that the outer collar 120 is secured to the inner collar 122 through an S-shaped isolation layer 124 having equal thickness throughout. The isolation layer 124 satisfies the same requirements as that of FIG. 7.

Figure 9:
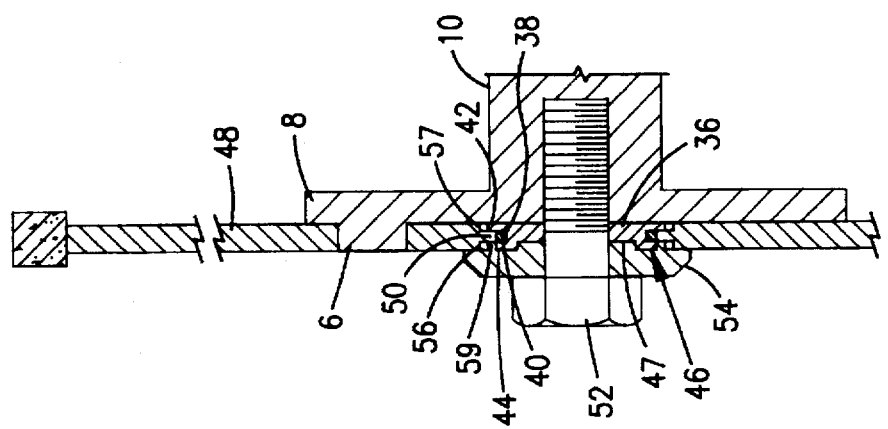
FIG. 9 is a side sectional view of an alternative embodiment with a vibration dampening coupler formed separate from the saw blade.

In the embodiment of FIG. 9, a separate vibration dampening coupler 36 is formed to releasably receive the saw blade 1. The vibration dampening coupler 36 is formed as a circular disk which is received directly against an end of the arbor shaft 10. The outer periphery of the vibration dampening coupler 36 includes a recessed groove 38 located between front and back ridges 44 and 42, respectively. The groove 38 receives a resilient isolation ring 40, such as a rubber O-ring. The diameter of the front ridge 44 is less than that of the back ridge 42. A front face 46 of the dampening coupler 36 includes a centrally recessed area 47.

An outer collar 48 represents the substantial majority of the core of the saw blade. The outer collar 48 includes an inner perimeter with a narrow inner race 50 centrally located thereon between front and back outer races 56 and 57. When installed, the blade is secured between a back flange 8 and a washer 54 and locking nut 52 which is threadably fastened to the arbor shaft 10. The back outer race 57 of the outer collar 48 is located proximate, but not in contact with the back ridge 42 of the coupler 36, while the inner race 50 abuts against the isolation ring 40. The front outer race 56 is located proximate, but not in contact with the front ridge 44. The inner surface of the washer 54 includes a ridged and recessed pattern therein to correspond with the contour of the front face of the coupler 36 and collar 48.

Once securely fastened together, an air gap is formed between the inner surface of the front outer race 56 and the outer surface of the projection 59 on the washer 54. An air gap is also formed between the inner surface of the back outer race 57 and the outer surface of the back ridge 42. In this manner, the isolation ring 40 is required only to provide radial support against the radial forces $R_f$. Thus, the isolation layer 40 need not be as wide as in the previous embodiments. The washer 54 and the flange 8 laterally support the outer collar 48 against lateral forces $L_f$, while the washer 54, flange 8 and pin 6 resist the cutting torque $C_T$. The pin 6 is slightly smaller than its receiving hole in the outer collar 48 to allow radial forces to be directed onto the isolation layer 40.

Figure 10A:
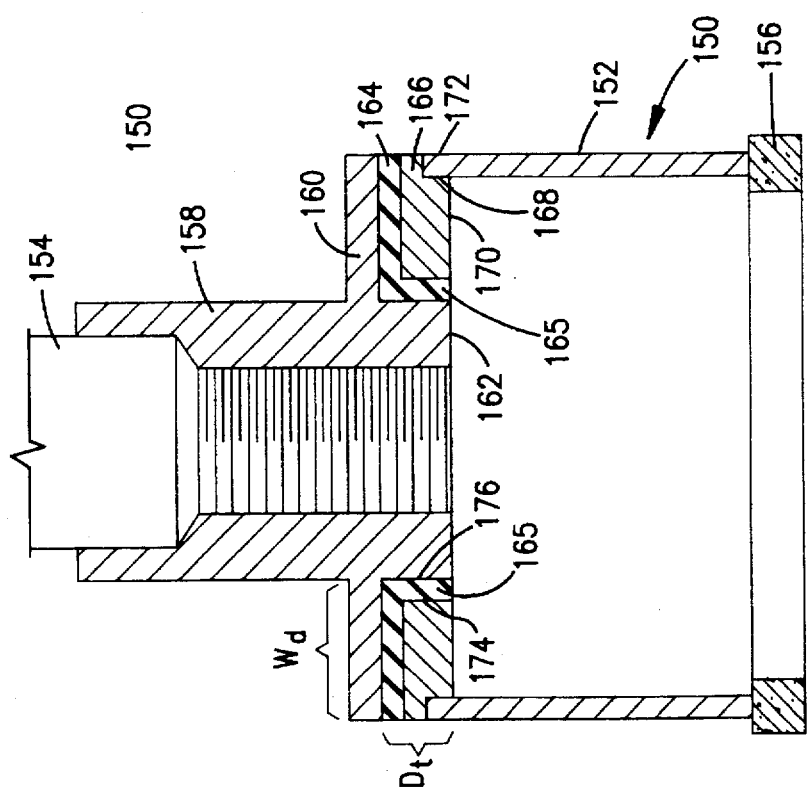

FIGS. 10A–10C illustrate alternative embodiments, in which the cutting blade 150 is formed to effect core drilling, such as to cut holes in walls for pipe, conduit and the like. In FIG. 10A, the cutting blade 150 is formed with a barrel-shaped outer collar 152 having a longitudinal axis parallel to the rotating axis of the arbor shaft 154. The outer collar 152 includes an outer end having a diamond embedded outer rim 156 thereon. The blade 150 further includes a tubular base 158 threadably received upon the arbor shaft 154 and extending in a direction parallel to the rotating direction of the arbor shaft 154. An inner flange 160 is secured to, and located about a circumference of the base 158. The inner flange 160 is located a distance $D_t$ away from outer end 162 of the base 158.

The inner flange 160 receives an isolation layer 164 on an outer face thereof. The isolation layer 164 receives an outer barrel flange 166 on its outer face. The outer barrel flange 166 includes a rectangular notch 168 about its perimeter and bordering its outer face 170. The rectangular notch 168 securely receives a tail end 172 of the outer collar 152. The inner and outer flanges 160 and 166 have a width $W_d$ sufficient to support the outer rim 156 during a cutting operation as explained above. The $W_d$ may differ from the width $W_f$ of the inner and outer flanges in the above discussed embodiments due to the varying configuration of the barrel shaped blade 150. The isolation layer 164 may be constructed in any of the above manners so long as it is able to support the outer rim 156 against the forces discussed above. Optionally, a secondary isolation layer (not shown) may be added within the rectangular notch 168 between the outer flange 166 and the outer collar 152. Also, a secondary isolation layer 165 may be added between the inner circumference 174 and the leading region 176 of the periphery of the base 158 to further prevent impact loads.

During operation, the outer rim 156 experiences forces parallel and perpendicular to the rotational axis thereof. The isolation layers 164 and 165 operate in the manner described above to prevent impact loads upon the outer rim 156.

FIGS. 10B and 10C illustrate alternative configurations for the isolation layer within the cutting blade 150. In FIG. 10B, an isolation layer 180 is substituted for the isolation layers 164 and 165 of FIG. 10A. The isolation layer 180 substantially resembles that of FIG. 8, and includes an S-shaped cross-section having equal thickness throughout. The isolation layer 180 completely separates inner and outer barrel sections 182 and 184. The inner barrel section 182 is secured directly to the inner flange 186.

FIG. 10C illustrates another embodiment in which an isolation layer 190 is formed with a Z-shaped cross-section to separate inner and outer collar sections 192 and 193. The isolation layer 190 has a body 191 which extends about the collars and about the rotational axis of the blade. The inner and outer collars 192 and 193 have inner and outer collar flanges 194 and 195, respectively, that extend in a direction parallel to the rotational axis. The body 191 of the isolation layer 190 is formed integrally with upper and lower resilient tips 196 and 197 which project in opposite directions to isolate entirely the outer collar 193 from the inner collar 192. The resilient tips 196 and 193 are flared nearest the outer surfaces of the blades front and back faces. The isolation layer 190 provides an interfacing surface having a width $W_{int}$ which extends the entire length of the body 191 and inner and outer flanges 196 and 197. The width $W_{int}$ of the interfacing surface must satisfy the same parameters as the width $W_d$ of the isolation layers 164 and 165 in the embodiment of FIG. 10A. Optionally, the inner collar 192 may be threadably secured to the base 158 and the central core 198 via threads 199.

FIGS. 11 and 12 illustrate a router tool used to bore holes such as by inserting the router tip into a pre-existing crack or hole. By way of example, router tools may be used to widen cracks in asphalt for sealing purposes. The router system 200 includes a router tool 202 formed with a hollow tubular rigid core 204 having diamond segments 206 securely fastened to the outer surface thereof. The diamond segments 206 may be formed from polycrystalline diamonds, diamond impregnated segments, electroplated diamonds and the like. The diamond section 206 may be formed from multiple diamond segments uniformly spaced about the perimeter of the tubular core 204, with the diamond sections 206 extending along a length of the core 204. Alternatively, the diamond section 206 may be constructed as a unitary complete shell covering the outer periphery of the core 204 including the outer tip. The tubular core tool 204 includes a flange/rank 208 formed on a lower end thereof. The rank 208 includes a grooved recess 210 about its periphery.

The router system 200 further includes a router arbor shaft which is secured to and rotated by a motor (not shown) about its longitudinal axis. The arbor shaft 220 includes an outermost section 224 which is formed with a diameter smaller than that of the major portion of the arbor shaft 220. The outermost section 224 includes an isolation layer 226, such as rubber and the like, laminated thereto. The isolation layer 226 extends along the entire length of the reduced diameter outermost section 224 and along the adjoining face 228 of the main section of the arbor shaft 220. Located slightly behind the adjoining face 228 of the arbor shaft 220 is a grooved recess 230 which extends about the periphery of the arbor shaft 220. During operation, the outermost section 224 of the arbor shaft 220 is slidably received within the hollow core 212 of the mounting tube 204 until the outer surface of the flange 208 abuts against the portion of the isolation layer 226 proximate the adjoining face 228. Once in this position, a retaining clamp 232 is installed. The retaining clamp 232 may be constructed in a half-moon shape having a curved surface which substantially corresponds to the outer curvature of the arbor shaft 220. The retaining clamp is constructed with a U-shaped cross-section such that outermost tips 233 and 234 thereof are received within the retaining recesses 210 and 230. In this manner, the retaining clamp securely fastens the mounting tube 204 to the arbor shaft 220. A mounting screw 236 passes through a hole within the retaining clamp 232 and is threadably received within a hole 238 in the arbor shaft 220. Once installed, the isolation layer 226 completely isolates the router tool 202 from the arbor shaft 220.

Alternatively, the router tool 202 may be constructed such that the diamond section 206 forms a cone shape over the outer tip of the router tool 202. In this manner, the diamond section 206 may be used to cut or drill a hole into a desired material.

FIGS. 13 and 14 illustrate side and end sectional views of a chainsaw link 300 which may be constructed according to the present invention. As illustrated in FIG. 13, a chainsaw link 300 includes a main body 302 with holes 304 and 306 extending therethrough to receive pins used to secure the link 300 to the chain. Turning to FIG. 14, the main body 302 is formed with a H-shaped cross-section wherein a diamond embedded cutting section 308 is secured within the upper half of the main body. The diamond section 308 may be secured to the main body 302 in a plurality of ways, such as with a bolt 310 or through adhesion bonding and the like. An isolation layer 312 is constructed in a substantially U shape to line the upper half of the main body 302. The isolation layer 312 completely separates the diamond section 308 from the main cross-section 314 of the main body 302. The diamond section 308 is constructed with a T-shaped cross-section with the base of the T cross-section extending into the upper channel of the main body 302. The diamond section 308 and the isolation layer 312 are constructed such that outer flanges 318 are raised above the outer rims 316 of the main body 302. An air gap 320 is provided between the outer rims 316 and the outer flanges 318. To prevent contact therebetween during operation.

As illustrated in FIG. 13, the isolation layer 312 includes a back section 321 which extends laterally upward from the cross-section 314 along the back end of the diamond section 308. The back section 321 of the isolation layer 312 functions to isolate the diamond section 308 from a back support 322 constructed within the main body of the link 302. The back support 322 and back isolation section 321 help resist lateral shearing forces exerted upon the diamond section 308 during operation.

During operation, the diamond section 308 experiences shearing and cutting forces along multiple directions including parallel and perpendicular to the longitudinal axis extending along the length of the main body 302. The isolation layer 312 functions to absorb each of these forces within the isolation layer portions below the diamond section, along each side of the diamond section and along the back end of the diamond section.

FIG. 15 illustrates a grinding tool which includes an arbor shaft 400 rotating along a longitudinal axis. Proximate its outer end, the arbor shaft 400 includes a circular flange 404 extending about its perimeter and having a front face 405 separating the main section of the arbor shaft 400 from an outer axial portion 406 thereof. The axial portion 406 is formed with a diameter slightly less than that of the main arbor shaft 400. An isolation layer 408 is formed about the perimeter of the axial portion 406 and along the front face 405 of the arbor shaft 400. A diamond embedded grinding tool 410 includes a hole through a center thereof to receive the isolation layer 408. A bolt 412 is threadably received within the end of the axial portion 406 of the arbor shaft 400 to securely retain the grinding tool 410 in a working position. Once installed, the grinding tool 410 is completely isolated, through the isolation layer 408, from the arbor shaft 400.

Figure 16A:
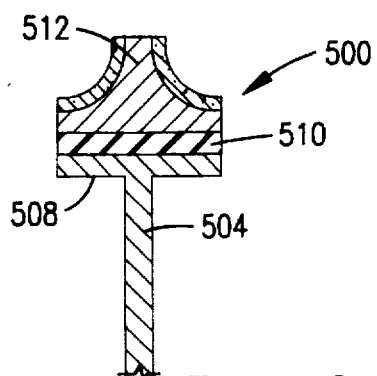
FIGS. 16A and 16B are side sectional views of alternative embodiments.
Figure 16B:
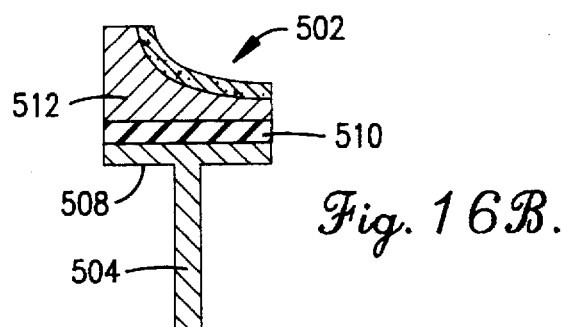

FIGS. 16A and 16B illustrate diamond profiling wheels 500 and 502. Each diamond profiling wheel includes an inner core 504 which is securely fastened to the arbor shaft of a motor (not shown) and rotated about the longitudinal axis. The outer periphery of the inner core 504 includes an inner flange 508 which projects laterally outward in opposite directions from the inner core 504. The inner flange 508 receives an isolation layer 510 about its outer periphery. The cutting segment 512 is located upon the outer periphery of the isolation layer 510 and constructed with an outer contour as desired. The cutting segment may be formed with a metal core electroplated with diamond embedded regions about its outer surface. Alternatively, the entire cutting segment 512 may be constructed from the diamond embedded material and ground to a desired contour. The diamond segment may be formed from polycrystalline diamonds and the like. The diamond segment may be resin bonded to the isolation layer 510 or the cutting segment 512. As illustrated in FIGS. 16A and 16B, the isolation layer is located proximate the profile segment 512. However, optionally, the isolation layer may be located remotely from the profiling segment 512, such as in FIGS. 2-9.

Figure 17:
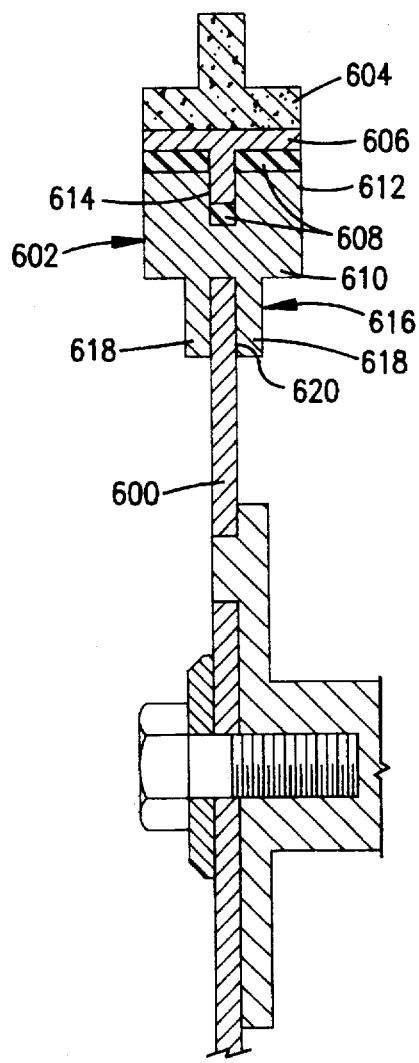
FIG. 17 is a side sectional view of an alternative embodiment.

FIG. 17 illustrates an alternative embodiment in which isolation layers may be separately disposed within each of a plurality of diamond segments securely fastened to the blade core. As illustrated in FIG. 17, a core segment 600 receives a diamond embedded segment 602 upon its outer periphery. A plurality of similar diamond embedded segments 602 may be arranged about the periphery of the core 600 with minor spacings therebetween. The diamond embedded segment 602 includes a diamond segment 604 located on its outermost periphery and, as illustrated, constructed with a T-shaped cross-section. The diamond section 604 is securely received upon a steel interface 606 which is also formed in a T shape. The diamond section 604 and the interface 606 are arranged proximate one another such that the top surfaces of each T section adjoin with one another. An inner periphery of the interface 606 is securely bonded to an isolation layer 608. The isolation layer includes segments immediately adjacent opposite cross arms of the T-shaped interface 606 and immediately adjacent the lower surface of the base of the interface 606.

The isolation layer 608 is received upon an inner collar flange 610. The inner collar flange 610 is formed with an upper portion 612 having a rectangular cross-section extending in a direction parallel to the longitudinal axis of rotation. The upper portion 612 includes a recessed notch 614 extending about the outer periphery of the flange 610 and aligned in a direction which substantially traces the outer periphery of the core 600. The isolation layer includes outermost portions securely fastened to the outer periphery of this upper section 612 of the flange 610. The isolation layer 608 further includes a lower portion securely fastened within the base of the notch 614. The notch 614 is constructed to receive a base of the T-shaped interface 606. The inner collar flange 610 further includes a lower section 616 comprised of support limbs 618 extending radially inward of the diamond segment 602. The support members 618 are located apart from one another to form a groove 620 therebetween having a width substantially equal to that of the core 600.

During operation, each diamond segment 602 is aligned with the core 600 such that an outer periphery of the core is received within the grooves 620. Thereafter, the outer periphery of the core 600 is securely fixed to the support members 618. A plurality of similar diamond embedded segments 602 are arranged about the periphery of the core to provide a cutting blade.

The segmented blade of FIG. 17 may be modified, such that the inner collar flange 610 is formed integrally with the core 600. In this embodiment, the inner collar flange 610 need not include support members 618. Also, the inner collar flange 616 need not include the notch 614 located along its centerline. Instead, the inner collar flange may include a smooth outer face which receives a single isolation layer 608. The isolation layer may be directly bonded to the diamond section 604 or alternatively, an interface 606 may be provided between the isolation layer 608 and the diamond section 604. The interface layer 606 need not be constructed in a T-shaped cross-section, but instead may be formed with a rectangular cross-section.

Figure 18:
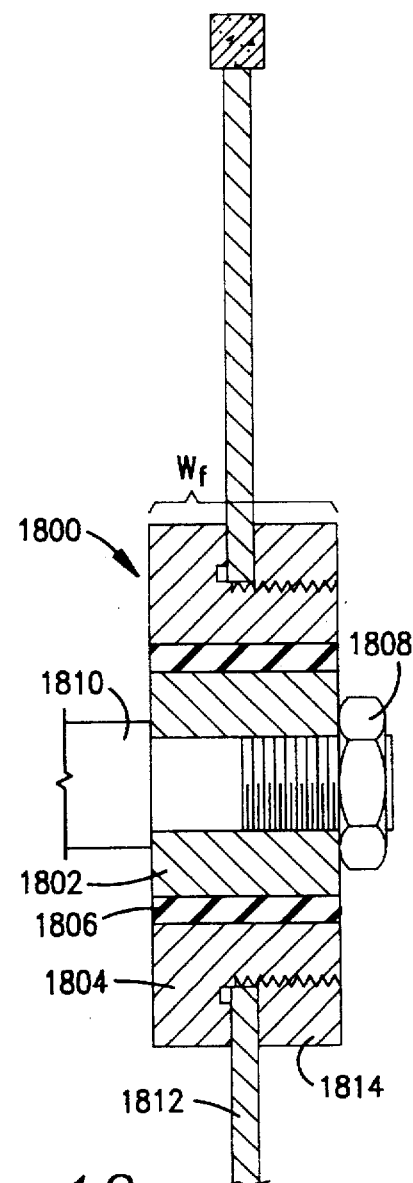
FIG. 18 is a side sectional view of an alternative embodiment.

FIG. 18 illustrates another embodiment in which a blade shaft collar is modified to include an isolation layer while still being operable with conventional diamond embedded blades or diamond wheels and the like. In FIG. 18, the shaft collar 1800 includes inner and outer collar flanges 1802 and 1804 separated from one another with an isolation layer 1806. The inner collar flange 1802 includes a hole through its center for receiving a nut 1808 to retain the collar 1800 securely against the arbor shaft 1810. The outer collar flange 1804 is shaped substantially similar to the outer collar flanges 68 and 86 of FIGS. 5 and 6. The outer collar flange 1804 receives an outer collar 1812 of a conventional blade. A keeper 1814 is threadably secured upon the outer collar flange 1804 to retain the blade securely thereon. The inner and outer collar flanges 1802 and 1804, and the isolation layer 1806 have a width $W_f$ corresponding to the width $W_f$ in the embodiments of FIGS. 1–6 for reasons explained above.

A variety of configurations may be used for the isolation layer, including those disclosed above, but not limited thereto, so long as the isolation layer prevents a radial metal-to-metal impact between the inner and outer collars. For instance, the O-rings may be changed to substitute harder or softer O-rings, thereby providing a stiffer or less stiff isolation layer. In addition, the isolation plugs 30 of FIG. 3 may be formed of different hardnesses (such as 20, 60, and 80 durometers). Intermingling hard and soft isolation plugs will desirably effect the harmonics. Also, the isolation layer having the void 22 therein may partially be filled with a liquid, such as Mercury, to function as a balancing liquid. When the blade begins to spin, the liquid within the void evenly distributes itself throughout the void about the circumference of the inner collar. Alternatively, the void may be entirely filled with liquid to change the pressure ratio therein, thereby increasing the stiffness of the isolation layer. The void could be surrounded by the isolation layer and vulcanized to the inner and outer collar flanges.

It is desirable to adjust the stiffness from the isolation layer based upon the material to be cut, such as fire retardant materials or soft material. The liquid within the void may be oil to act as a heat dissipator. By using an isolation layer, the instant invention is able to drop the noise level by 4–5 decibels, such as when outputting 105–115 decibels. Further, by including an isolation layer, a substantial portion of the core may be made of aluminum and the like, while the outer portion of the core is formed from steel.

Moreover, the isolation layer need not be a continuous ring about the circumference of the inner collar flange, instead, the isolation layer may be a series of discreet segments so long as these segments satisfy the above discussed parameters.

The above-discussed inventions have exhibited unexpected results by way of lengthening the life of a diamond embedded cutting wheel by up to three times the normal life expectancy.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A core drill comprising:

a cylindrical cutting blade having a top end and a bottom end interconnected by a cylindrical side wall, said bottom end being open and having embedded hardened particles that project out therefrom, said top end being adapted for driving said cylindrical cutting blade about a rotational axis during a cut; and a resilient isolation layer, formed in said cylindrical side wall between said top end and said bottom end of said cylindrical cutting blade, for preventing impact loads between said particles on said bottom end and a cutting surface of a material, said resilient isolation layer being uninterrupted and having outerfacing surfaces on opposite sides of said side wall of said cylindrical cutting blade.

2. The core drill according to claim 1, wherein said isolation layer is formed with a S-shaped cross-section.

3. The core drill according to claim 1, wherein said isolation layer is formed with a Z-shaped cross-section.

4. The core drill according to claim 1, wherein said top end of said cylindrical cutting blade is closed.

5. A cutting blade comprising:

a disk shaped core having inner and outer collars adapted for driving said core about a rotational axis during a cut;

a circular outer rim operatively coupled to said core for executing a cut upon a cutting surface of a material, said outer rim including embedded hardened particles that project from an outer periphery of said outer rim to bring about said cut, said outer rim having a thickness in a direction parallel to said rotational axis;

a resilient isolation layer, formed between said inner and outer collars of said core, for preventing impact loads between said particles in said outer rim and said cutting surface, said isolation layer having interfacing surfaces on opposite sides thereof which receive said inner and outer collars, said isolation layer having a width that is greater than said thickness of said outer rim to support said outer rim during a cut.

6. The cutting blade as in claim 5, said inner and outer collars being securely interconnected for unitary rotation about said rotational axis.

7. The cutting blade as in claim 5, wherein said isolation layer represents at least one integral layer received between said inner and outer collars.

8. The cutting blade as in claim 5, said isolation layer represents two integral layers received between said inner and outer collars wherein the combined widths of said two layers are greater than said thickness of said outer rim to support said outer rim during a cut.

* * * * *